(12) United States Patent
Zheng

(10) Patent No.: US 10,724,496 B2
(45) Date of Patent: Jul. 28, 2020

(54) REVERSIBLE WATER PUMP AND HYDROTURBINE

(71) Applicant: Guangsheng Zheng, Zhanjiang (CN)

(72) Inventor: Guangsheng Zheng, Zhanjiang (CN)

( * ) Notice: Subject to any disclaimer, the term of this patent is extended or adjusted under 35 U.S.C. 154(b) by 480 days.

(21) Appl. No.: 15/550,056

(22) PCT Filed: Jan. 28, 2016

(86) PCT No.: PCT/CN2016/072466
§ 371 (c)(1),
(2) Date: Aug. 10, 2017

(87) PCT Pub. No.: WO2016/127817
PCT Pub. Date: Aug. 18, 2016

(65) Prior Publication Data
US 2018/0023532 A1 Jan. 25, 2018

(30) Foreign Application Priority Data
Feb. 13, 2015 (CN) .......................... 2015 1 0082812

(51) Int. Cl.
*F03B 3/10* (2006.01)
*F03B 3/12* (2006.01)
*F03B 3/18* (2006.01)

(52) U.S. Cl.
CPC .............. *F03B 3/103* (2013.01); *F03B 3/121* (2013.01); *F03B 3/18* (2013.01); *F05B 2240/13* (2013.01); *Y02E 10/223* (2013.01)

(58) Field of Classification Search
CPC ............. F03B 3/103; F03B 3/121; F03B 3/18
(Continued)

(56) References Cited

U.S. PATENT DOCUMENTS 4,218,176 A * 8/1980 Gawne ...................... F01D 1/34
 415/201
4,280,791 A * 7/1981 Gawne .................... F04D 5/001
 415/90

FOREIGN PATENT DOCUMENTS

CN 101509461 A 8/2009
CN 103967685 A 8/2014
(Continued)

OTHER PUBLICATIONS

International Search Report PCT/CN2016/072466; dated Jan. 28, 2016; 2 Pgs.

*Primary Examiner* — Kenneth Bomberg
*Assistant Examiner* — Michael L Sehn
(74) *Attorney, Agent, or Firm* — Schmeiser, Olsen & Watts, LLP

(57) ABSTRACT

A reversible water pump and hydroturbine including a housing and a rotor is provided. The housing includes two end boards, which have the same shape, and a sideboard that connects the two end boards respectively. Each end board includes two coaxial semicircle boards having two different radiuses, that is, a large semicircular board and a small semicircular board which are joined together at their diameter; the side board includes a first round sideboard and a second round sideboard, two inlets/outlets, i.e. a first inlet/outlet and a second inlet/outlet, are formed at the ends of the first round sideboard. The rotor includes a rotary shaft, a rotary wheel and at least two blades, a service channel forms between the rotary wheel and the second round sideboard, and a return channel forms between the rotary wheel and the first round sideboard.

6 Claims, 3 Drawing Sheets

(58) Field of Classification Search
USPC .......................................................... 415/220
See application file for complete search history.

(56) References Cited

FOREIGN PATENT DOCUMENTS

| | | |
|---|---|---|
| CN | 104265543 A | 1/2015 |
| CN | 104747345 A | 7/2015 |
| DE | 4325402 A1 | 2/1995 |
| WO | WO9946481 A1 | 9/1999 |

* cited by examiner

US 10,724,496 B2

REVERSIBLE WATER PUMP AND HYDROTURBINE

CROSS-REFERENCE TO RELATED APPLICATIONS

This application claims priority to PCT Application No. PCT/CN2016/072466, having a filing date of Jan. 28, 2016, based on CN 201510082812.X having a filing date of Feb. 13, 2015, the entire contents both of which are hereby incorporated by reference.

FIELD OF TECHNOLOGY

The following relates to the field of water pumps and hydroturbines, in particular, to reversible water pumps and hydroturbines.

BACKGROUND

Conventional hydroturbines were usually operated by virtue of water potential energy enhanced by a dam so that water energy can be effectively utilized. If there is no such dam, the conventional hydroturbine will have low efficiency to convert water flow energy into mechanical energy. Although huge water energy exists in rivers and seas, most cannot be utilized as most of the places are not suitable for constructing dams. As height of water head has great influence on performance of the hydroturbine, low-head hydroturbine can hardly apply to the river and sea where the dams cannot be constructed.
On the other hand, a water pump is essential equipment in agricultural irrigation and breeding, and it usually pumps water one direction, but cannot perform in a reversible direction.

SUMMARY

An aspect relates to a reversible water pump and hydroturbine, which can be utilized in nature using water energy with any water head in the river or sea, in order to solve the technical problems mentioned above. For example, the water pump can pump water in one way only, and the hydroturbine had low efficiency and high cost.

Therefore, embodiments of the present invention can be achieved by the following technical solutions:

The reversible water pump and hydroturbine according to embodiments of the present invention comprises a housing and a rotor movably provided in the housing.

The housing comprises two end boards, which have same shape and are parallel-disposed oppositely, and a sideboard that connects the two end boards respectively. Each end board includes two coaxial semicircle boards having two different radiuses, that is, a large semicircular board and a small semicircular board are joined together at their diameter, wherein an axis hole is provided; the sideboard comprises a first round sideboard to seal two large semicircular boards completely, and a second round sideboard to seal two small semicircular boards completely, such that two inlets/outlets, i.e. a first inlet/outlet and a second inlet/outlet, are formed at the ends of the first round sideboard.

The rotor comprises a rotary shaft, a rotary wheel arranged on the rotary shaft, and two blades configured on an outer wall of the rotary wheel. A service channel forms between two small semicircular boards, the second round sideboard and the rotary wheel, and a return channel forms between two large semicircular boards, the first round sideboard and the rotary wheel, the radial cross section area of the service channel is identical to the area of the blades and is smaller than the radial cross section area of the return channel.

The housing is provided with a first water-blocking apparatus at the return channel, near the first inlet/outlet, a second water-blocking apparatus at the return channel, near the second inlet/outlet, and a driving device to drive the first water-blocking apparatus and the second water-blocking apparatus in an open status or a close status alternatively, the relative angle of the first water-blocking apparatus and the second water-blocking apparatus disposed on the first round sideboard is between 60° and 120°.

Furthermore, the first water-blocking apparatus and the second water-blocking apparatus are both provided with a sealing sleeve on the housing, each of the sealing sleeve is provided with a guide rod, a rod clamp, an opening, a water-blocking plate and a guide rail configured on the housing, the water-blocking plate is configured on the guide rail slidably, the guide rail is configured along the radial dimension of the large semicircular board. The opening configured on the first round sideboard can accommodate the guide rail to allow the water-blocking plate to slide into and out of the return channel. The guide rail passes through the first round sideboard and extends along the radial direction of the large semicircular board. One end of the guide rod is mounted to the water-blocking plate; the other end of the guide rod is embedded in the cam groove slidably. The water-blocking plate is configured on the guide rails slidably. The return channel will be blocked when the water-blocking plate slides into the return channel and contacts with the rotary wheel completely, and the blades can pass through the return channel when the water-blocking plate exits from the return channel. The sealing sleeve is connected to the first round sideboard, for sealing the opening, the guide rail, the guide rod, the rod clamp and the water-blocking plate which all are within the sealing sleeve.

Furthermore, the driving device comprises a cam fixed on the rotary shaft, and the periphery of the cam is provided with a cam groove in which guide rods respectively connected to the water-blocking plates, one end of each guide rod is embedded in the cam groove slidably, and the other end is mounted to the water-blocking plate, thereby the rotation of the cam allows the guide rods to lead the water-blocking plates to perform a linear reciprocating motion, so that at least one water-blocking plate can block the return channel.

Furthermore, the driving device comprises a hydraulic system including a power source, a trigger element, a control valve and an executive element, the executive element is connected to the water-blocking plate, the control valve is configured on the housing, and the trigger element for the control value is configured on the rotary shaft.

Furthermore, the water pressures on both sides of the water-blocking plate are not equal due to the water pressure difference between the first inlet/outlet and the second inlet/outlet, thus a water pressure balance device is arranged on both sides of the water-blocking plate, to reduce the resistance to move the water-blocking plate outward. Two ends of the water pressure balance device are arranged at both sides of the water-blocking plate in its close status respectively while are mounted on the large semicircle board via a tube. Prior to the water-blocking plate being open, the cam mounted to the rotary shaft is designed to push on the switch of the water pressure balance device, so that the water on both sides of the water-blocking plate can be communicated and the water pressure difference therebetween can be eliminated; when the cam rotates to turn the switch off, the water on both sides of the water-blocking plate will not be communicated.

Furthermore, the two blades are arranged on the rotor in opposite direction.

Compared with the known, advantages of the present application are as follows:
1. An annular channel is formed by the rotor and the housing, the blades can rotate forward and backward, and two inlets/outlets are configured therein, thus the water pumping can be achieved in two way, and embodiments of the invention can work as a reversible hydroturbine.
2. The blades in embodiments of the present invention pushed by the water flow then rotate, and two water-blocking apparatus are utilized to open and block the return channel in turn, so that the blades can pass through the return channel while the water flow is blocked therein, thus the water pump and hydroturbine can work efficiently.

BRIEF DESCRIPTION

Some of the embodiments will be described in detail, with reference to the following figures, wherein like designations denote like members, wherein.

Figure 1:
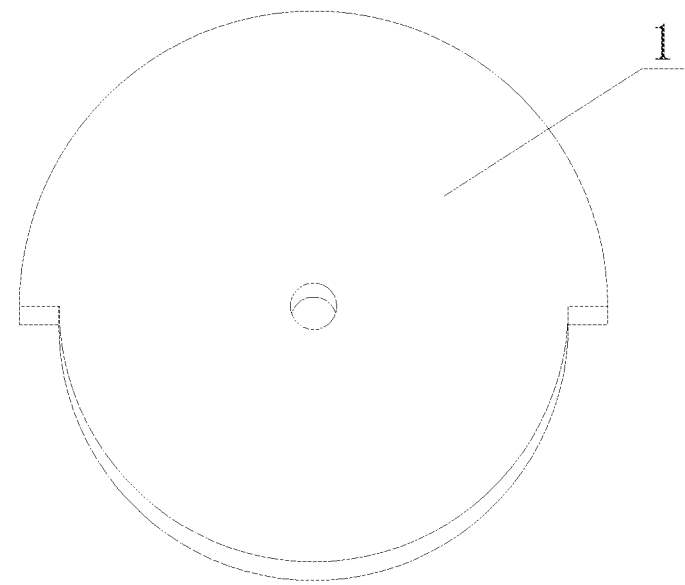
FIG. 1 is a schematic view of the end boards of the reversible water pump and hydroturbine according to embodiments of the present invention.

LIST OF REFERENCE CHARACTERS 1 end boards
2 housing
21 first inlet/outlet
22 second inlet/outlet
23 first round sideboard
231 return channel
24 second round sideboard
241 service channel
25 sealing sleeve
3 rotor
31 rotary shaft
32 rotary wheel
33 first blade
34 second blade
4 first water-blocking apparatus
41 first water-blocking plate
42 guide rail
43 water pressure balance device
5 cam
51 cam groove
6 guide rod
61 rod clamp
7 second water-blocking apparatus

DETAILED DESCRIPTION

A preferred embodiment of the present invention will be described hereinafter with the reference to accompanying drawings. It should be understood that the preferred embodiment described here is only for describing and explaining the present invention, but not for limiting the present invention.

As shown in FIGS. 1-6, the reversible water pump and hydroturbine according to the present invention comprises a housing 2 and a rotor 3 movably provided within the housing 2. The housing 2 comprises two end boards 1, which have same shape and are parallel-disposed oppositely, and a sideboard that connects the two end boards 1 respectively. Each end board 1 is consisted of two coaxial semicircle boards having two different radiuses, that is, a large semicircular board and a small semicircular board are joined together at their diameter, wherein an axis hole is provided. The sideboard comprises a first round sideboard 23 to seal two large semicircular boards completely, and a second round sideboard 24 to seal two small semicircular boards completely, such that two inlets/outlets, i.e. a first inlet/outlet 21 and a second inlet/outlet 22, are formed at the ends of the first round sideboard 23.

The rotor 3 comprises a rotary shaft 31, a rotary wheel 32 arranged on the rotary shaft 31, and two blades configured on an outer wall of the rotary wheel 32. Two blades, first blade 33 and second blade 34, are arranged on the rotor 3 in opposite direction.

A service channel 241 forms between two small semicircular boards, the second round sideboard 24 and the rotary wheel 32, and a return channel 231 forms between two large semicircular boards, the first round sideboard 23 and the rotary wheel 32. The radial cross section area of the service channel 24 is identical to the area of the blades 33 and 34, and is smaller than the radial cross section area of the return channel 231.

The housing 2 is provided with a first water-blocking apparatus 4 at the return channel 231, near the first inlet/outlet 21, a second water-blocking apparatus 7 at the return channel 231, near the second inlet/outlet 22, and a driving device to drive the first water-blocking apparatus 4 and the second water-blocking apparatus 7 in an open status or a close status alternatively. The relative angle of the first water-blocking apparatus 4 and the second water-blocking apparatus 7 disposed on the first round sideboard 23 is between 60° and 120°.

The first water-blocking apparatus 4 and the second water-blocking apparatus 7 are both provided with an opening, a guide rail 42, a guide rod 6, a rod clamp 61, a water-blocking plate 41, and a sealing sleeve 25. The opening is configured on the housing of the return channel 231, and can accommodate the guide rail to allow the water-blocking plate 41 to slide into and out of the return channel 231. The guide rail 42 passes through the first round sideboard 23 and extends along the radial direction of the large semicircular board. One end of the guide rod 6 is mounted to the water-blocking plate 41, the other end of the guide rod 6, having L-shaped structure, is embedded in the cam groove 51 slidably, and the guide rod 6 is positioned by the rod clamp 61. The water-blocking plate 41 is configured on the guide rails 42 slidably. The return channel 231 will be blocked when the water-blocking plate 41 slides into the return channel 231 and contacts with the rotary wheel 32 completely, and the blades can pass through the return channel 231 when the water-blocking plate 41 exits from the return channel 231. The sealing sleeve 25 is connected to the large semicircular board, for sealing the opening, the guide rail 42, the guide rod 6, the rod clamp 61 and the water-blocking plate 41 which all are within the sealing sleeve 25, the rod clamp 61 is mounted to the sealing sleeve 25. The water-blocking plate in the embodiment is push-pull water-blocking plate, however, the water-blocking plate of the present invention is not limited to the push-pull water-blocking plate, and may be a water-blocking plate in rolling shutter mode or other movable configuration which is able to block the return channel.

The driving device comprises a cam 5 fixed on the rotary shaft 31. The periphery of the cam 5 is provided with a cam groove 51 that receives the L-shaped end of the guide rod 6. As the other end of the guide rod 6 is mounted to the water-blocking plate 41, the rotation of the cam 5 allows the guide rods 6 to lead the water-blocking plate 41 to perform a linear reciprocating motion so that at least one water-blocking plate 41 can block the return channel 231. A cam is utilized in the embodiment to drive the water-blocking plate 41 to block/open the return channel 231, however, the other control means, such as hydraulic system or pneumatic system or other structure, can be used to drive the water-blocking plate 41 to block/open the return channel 231 through a driving signal send by a trigger element arranged on the rotor.

The radial cross section area of the return channel 231 is larger than the area of the blades 33 and 34, and the area of the blades 33 is identical to the radial cross section area of the service channel 24, so that the blades can fit the service channel 24, and all water flow energy in the service channel would act on the blades.

Besides, either one of the water-blocking apparatus in the return channel is in a close status, to block the water flow, thus water flow into the hydroturbine can only flow into the service channel while the water cannot flow in the return channel, and only blades can pass through the return channel as two water-blocking apparatus are in an open status and a close status alternatively.

The radial cross sectional area of the return channel 231 is larger than the area of the blades 33 and 34, then the water in the return channel may flow through the space between the blade and the first round sideboard 23 so that the blade can pass through the return channel smoothly.

The water pressures on both sides of the water-blocking plate 41 are not equal due to the water pressure difference between the first inlet/outlet 21 and the second inlet/outlet 22, thus a water pressure balance device 43 is arranged on both sides of the water-blocking plate 41, to reduce the resistance to move the water-blocking plate outward, such that the pressure on both sides of the water-blocking plate will be balanced before the water-blocking plate moves outward, and the resistance to prevent the water-blocking plate from moving outward will be reduced.

Figure 2:
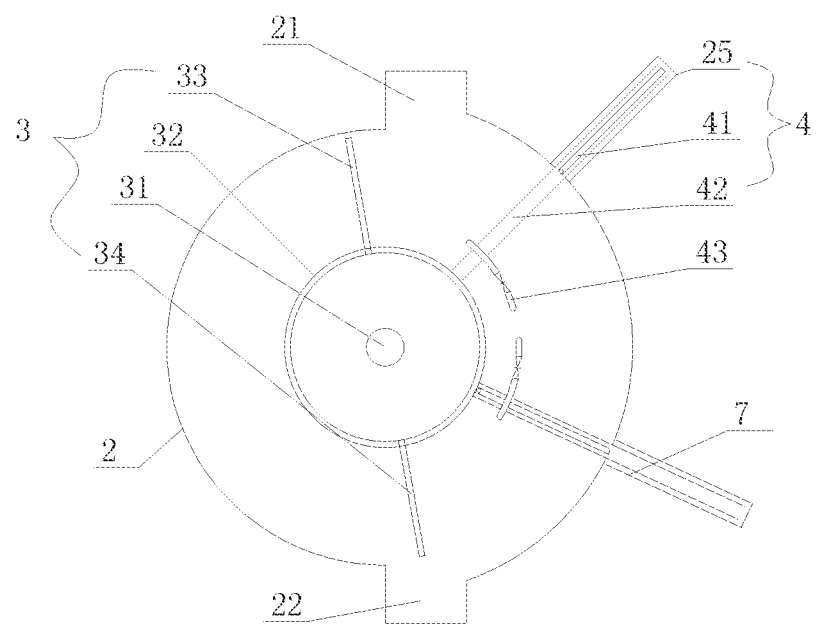
FIG. 2 is a schematic view of the structure of the reversible water pump and hydroturbine according to embodiments of the present invention.
Figure 3:
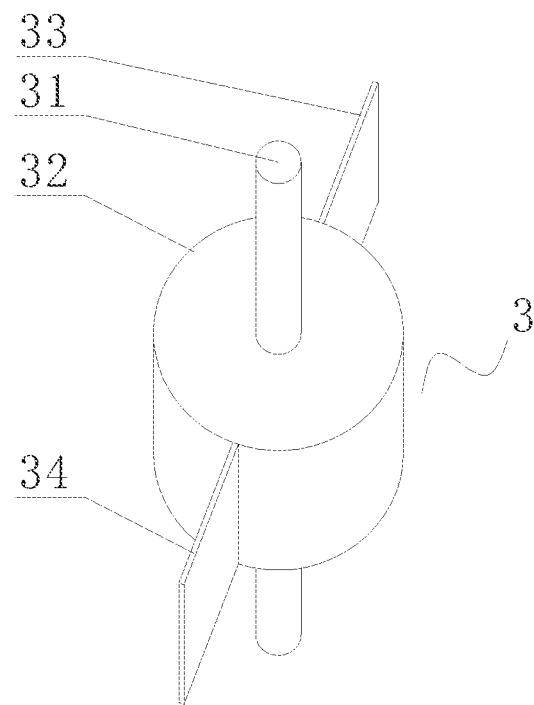
FIG. 3 is a schematic view of the structure of the rotor in the reversible water pump and hydroturbine according to embodiments of the present invention.
Figure 4:
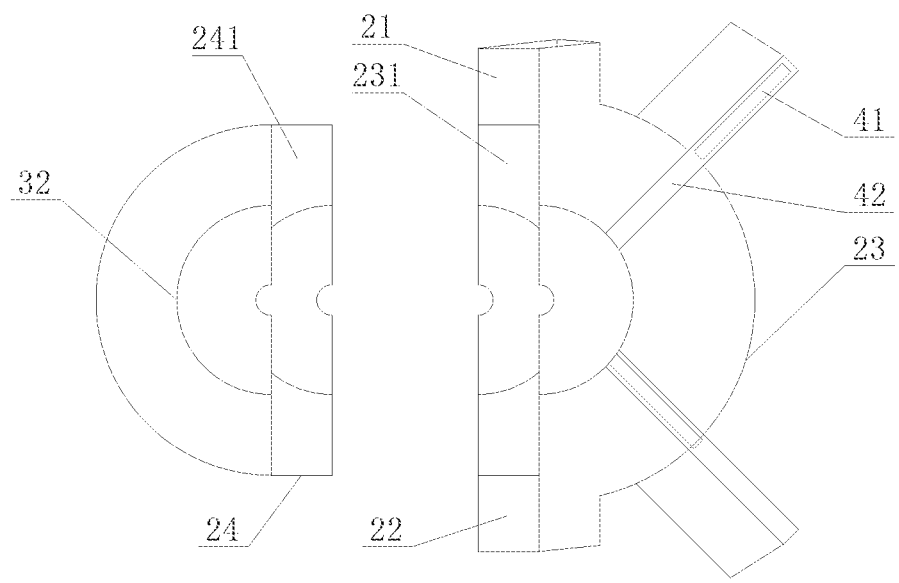
FIG. 4 is a schematic view of the structure of the housing of the reversible water pump and hydroturbine according to embodiments of the present invention.
Figure 5:
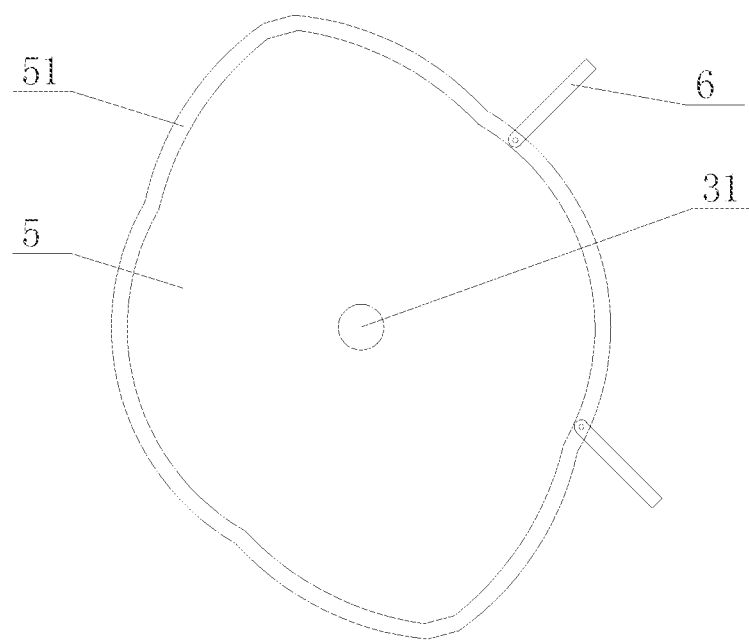
FIG. 5 is a schematic view of the structure of the cam controlling device in the reversible water pump and hydroturbine according to embodiments of the present invention.
Figure 6:
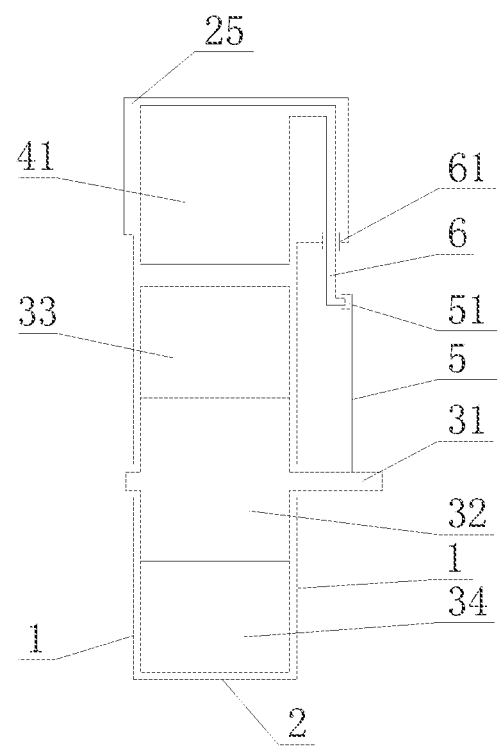
FIG. 6 is a schematic view of the internal structure of the reversible water pump and hydroturbine according to embodiments of the present invention.

As shown in FIG. 2, two ends of the water pressure balance device 43 are arranged at both sides of the water-blocking plate 41 respectively in its close status, and are mounted on the large semicircle board via a tube. Prior to the water-blocking plate 41 being open, the cam 5 mounted to the rotary shaft is designed to push on the switch of the water pressure balance device, so that the water on both sides of the water-blocking plate 41 can be communicated and the water pressure difference therebetween can be eliminated; When the cam rotates to turn the switch off, the water on both sides of the water-blocking plate 41 will not be communicated.

The working principle of the reversible water pump and hydroturbine according the present invention is as follows: Water flows into the second inlet/outlet 22, but either the first water-blocking apparatus 4 or the second water-blocking apparatus 7 in the return channel 231 is in a close status, the water cannot flow in the return channel 231, thus the water pushes the first blade 33 of the hydroturbine to rotate from the second inlet/outlet 22 to the first inlet/outlet 21 via the service channel 241, then exits from the first inlet/outlet 21. The groove 51 of the cam 5 fixed on the rotary shaft 31 pushes the guide rod 6 of the first water-blocking apparatus 4 out to open the first water-blocking plate 41, meanwhile the first blade 33 turns towards the first water-blocking plate 41. When the water-blocking plate 41 opens completely, the first blade 33 will pass through the position where the first water-blocking plate 41 was located previously, then the groove 51 of the cam 5 pulls the guide rod 6 of the first water-blocking apparatus 4 to close the first water-blocking plate 41. When the first water-blocking plate 41 is completely closed and maintained, the groove 51 of the cam 5 fixed on the rotary shaft 31 pushes the guide rod of the second water-blocking apparatus 7 to open the second water-blocking plate. When the second water-blocking plate of the second water-blocking apparatus 7 is open completely, the first blade 33 will pass through the position where the second water-blocking plate was located previously, then the cam groove 51 pulls the guide rod of the second water-blocking apparatus 7 to close the second water-blocking plate. When the second water-blocking plate is closed completely and maintained, the first blade 33 returns to the second inlet/outlet 22. Then the second blade 34 will repeat the process of the first blade 33, and the water flow keeps pushing the blades such that the water flow energy is converted into mechanical energy by such hydroturbine.

In order to reduce the resistance to open the water-blocking plate as an unbalanced pressure acts on both sides of the water-blocking plate, a through hole is configured prior to the water-blocking plate being open, then the pressure on both sides of the water-blocking plate is balanced and the resistance of opening the water-blocking plate is reduced.

The first inlet/outlet 21 may act as an inlet, while the second inlet/outlet 22 may act as an outlet, therefore the hydroturbine may rotate forward and backward with same work principle mentioned above.

The present invention may act as a water pump to pump water from low position to high position when applying power to the rotary shaft, Either the first inlet/outlet 21 or the second inlet/outlet 22 may be an inlet and the other is an outlet. Likewise the water pump can rotate forward and backward to achieve two-directions water pump.

Other structure of the reversible water pump and hydroturbine according to the embodiment can refer to prior art.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A reversible water pump and hydroturbine, comprising a housing and a rotor movably provided in the housing; wherein the housing comprises two end boards, which have a same shape and are disposed parallel to and opposite each other, and a sideboard that connects the two end boards respectively; each end board includes two coaxial semicircle boards having two different radii: a large semicircular board and a small semicircular board joined together at their diameter, wherein an axis hole is provided; the sideboard comprises a first round sideboard to seal the two large semicircular boards completely, and a second round sideboard to seal the two small semicircular boards completely, such that a first inlet/outlet and a second inlet/outlet are formed at the ends of the first round sideboard;

the rotor comprises a rotary shaft, a rotary wheel arranged on the rotary shaft, and two blades configured on an outer wall of the rotary wheel; a service channel is between the two small semicircular boards of the two end boards, the second round sideboard and the rotary wheel, and a return channel is between the two large semicircular boards of the two end boards, the first round sideboard and the rotary wheel, the radial cross-sectional area of the service channel is identical to the area of the blades and is smaller than the radial cross-sectional area of the return channel;

the housing is provided with a first water-blocking apparatus at the return channel, near the first inlet/outlet, a second water-blocking apparatus at the return channel, near the second inlet/outlet, and a driving device to drive the first water-blocking apparatus and the second water-blocking apparatus in an open status or a closed status alternatively, the relative angle of the first water-blocking apparatus and the second water-blocking apparatus disposed on the first round sideboard is between 60° and 120°.

2. The reversible water pump and hydroturbine according to claim 1, wherein each of the first water-blocking apparatus and the second water-blocking apparatus are provided with a sealing sleeve, the sealing sleeve being configured on the housing, each sealing sleeve is provided with a guide rod, a rod clamp, a water-blocking plate and a guide rail, both the guide rails are disposed on the housing, the first water-blocking plate and the second water-blocking plate are movably arranged on the two guide rails of the first water-blocking apparatus and the second water-blocking apparatus, respectively, and the two guide rails are configured parallel to the radial direction of the two large semicircular boards.

3. The reversible water pump and hydroturbine according to claim 2, wherein the driving device comprises a cam fixed on the rotary shaft, and the periphery of the cam is provided with a cam groove, the guide rods of the first water-blocking apparatus and the second water-blocking apparatus are embedded in the cam groove slidably at one end, and the other end of the two guide rods are respectively connected to the first water-blocking plate and the second water-blocking plate, respectively, thereby the rotation of the cam allows the two guide rods to lead the water-blocking plates to perform a linear reciprocating motion, so that at least one water-blocking plate can block the return channel.

4. The reversible water pump and hydroturbine according to claim 2, wherein the driving device comprises a hydraulic system including a power source, a trigger element, a control valve and an executive element, the executive element is connected to one of the water-blocking plates, the control valve is configured on the housing, and the trigger element for the control value is configured on the rotary shaft.

5. The reversible water pump and hydroturbine according to claim 2, wherein each of the first water-blocking apparatus and the second water-blocking apparatus comprises a water pressure balance device to connect or disconnect both sides of the first water-blocking plate and the second water-blocking plate, respectively.

6. The reversible water pump and hydroturbine according to claim 1, wherein the two blades are arranged on the rotor in opposite directions.

* * * * *